Aug. 7, 1962 C. DORNIER, JR 3,048,355
FUSELAGE FRAME
Filed Oct. 29, 1958 3 Sheets-Sheet 1

INVENTOR.
Claudius Dornier jr
BY

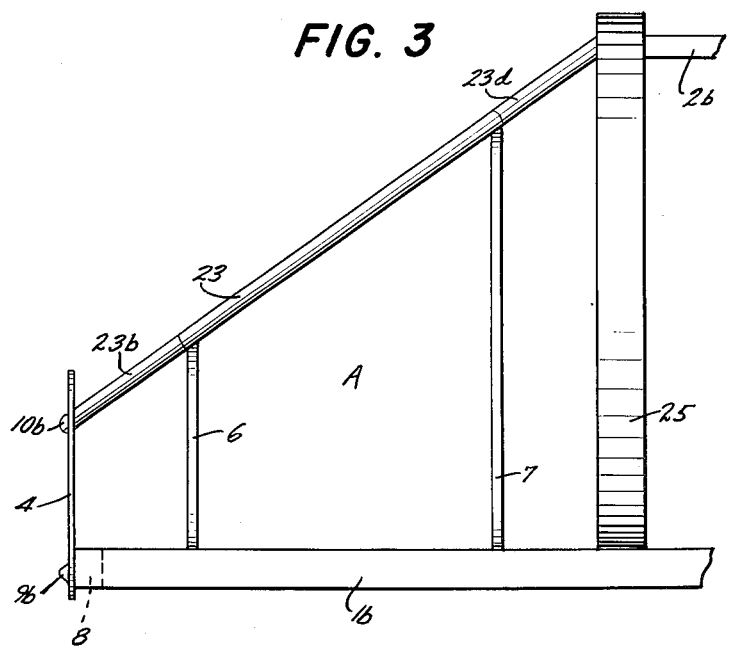
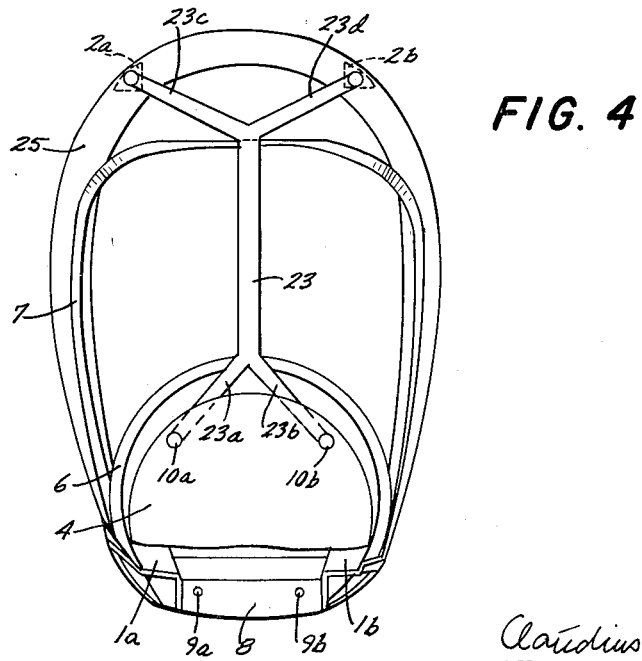

Aug. 7, 1962     C. DORNIER, JR     3,048,355
FUSELAGE FRAME

Filed Oct. 29, 1958     3 Sheets-Sheet 3

INVENTOR.
Claudius Dornier, jr.
BY Michael S. Striker
Attorney 3,048,355
FUSELAGE FRAME
Claudius Dornier, Jr., Grafelfing, Germany, assignor to Firma Dornier-Werke G.m.b.H., Friedrichshafen, Germany
Filed Oct. 29, 1958, Ser. No. 770,510
Claims priority, application Germany May 12, 1958
7 Claims. (Cl. 244—119)

The present invention relates to an aircraft fuselage, and more particularly to improvements in the fuselage frame.

An object of the invention is to provide in a fuselage frame a cabin with good aerodynamic characteristics.

Another object of the invention is to provide in an aircraft fuselage a cabin with greatly improved visibility and accessibility.

A further object of the instant invention is to provide in a fuselage frame a cabin of greatly simplified and very sturdy construction which is particularly suitable for that type of aircraft in which the power plant is mounted in the nose of the fuselage.

The above and certain other objects of the invention are attained by the provision of a fuselage frame in which the forward ends of lower longerons extend to the nose or front plate of the fuselage whereas the forward ends of upper longerons terminate at the main supporting frame disposed behind the pilot's cabin, and which further comprises an inclined strut disposed in a vertical plane and extending between the upper parts of the front or nose plate and of the supporting frame of the fuselage, respectively. The inclined strut may be formed with a single or with a pair of bifurcated end portions whose terminals are connected, either directly or indirectly, with the main supporting frame and with the lower longerons, respectively. The main supporting frame may be of the closed or of the open type, and the forward ends of lower longerons are preferably connected by a crossbeam to further strengthen the cabin-surrounding portion of the fuselage frame. The inclined strut can simultaneously serve as a means for supporting the hinges on which one or both halves of the transparent cabin window or wall are mounted. Additional arcuate support means for the cabin window may be provided between the nose plate and the main supporting frame, if desired.

The novel features which are considered as characteristic for the invention are set forth in particular in the appended claims. The invention itself, however, both as to its construction and its method of operation, together with additional objects and advantages thereof, will be best understood from the following description of two specific embodiments when read in connection with the accompanying drawings, in which:

FIG. 3 is a schematic view, similar to that of FIG. 1, showing a slight modification of the improved fuselage frame;

FIG. 4 is front elevational view of the assembly shown in FIG. 3, the nose plate being partly broken away.

Figure 1:
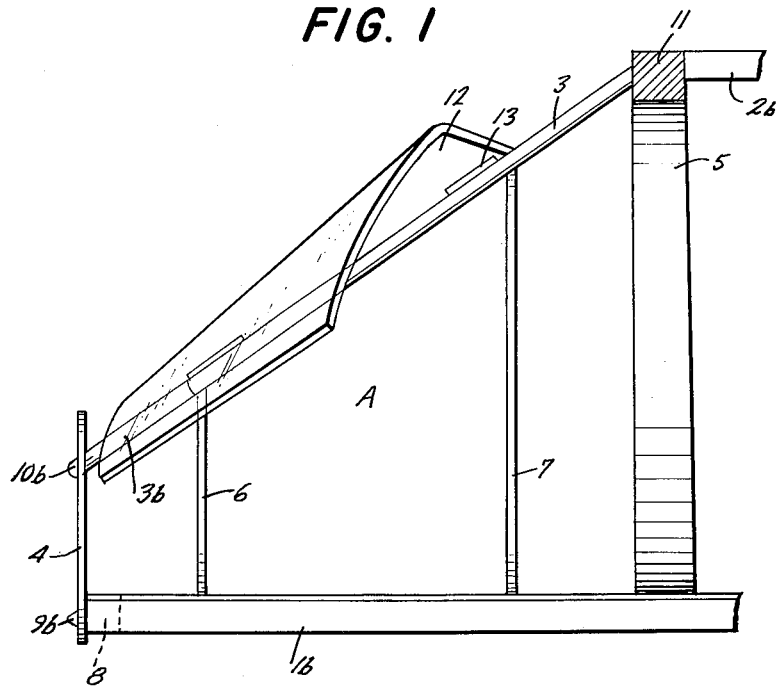
FIG. 1 is somewhat schematic side elevational view of the front end portion of a fuselage frame constructed in accordance with one embodiment of the invention.
Figure 2:
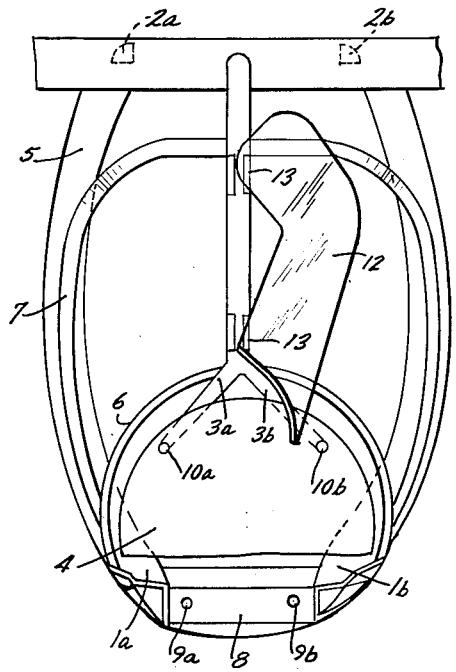
FIG. 2 is front elevational view of the structure shown in FIG. 1, with the nose plate partly broken away.
Figure 5:
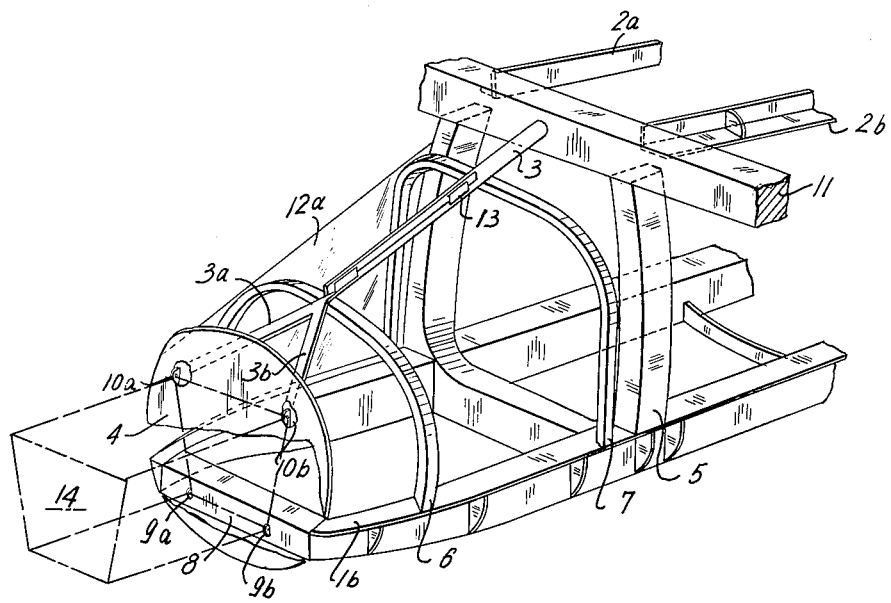
FIG. 5 is a perspective view of the structure shown in FIGS. 1 and 2, with the nose plate partly broken away and diagrammatically showing the power plant.

Referring now in greater detail to the drawings, and first to FIGS. 1 and 2, the structure therein shown represents schematically the front portion of a fuselage frame which comprises a pair of lower main longitudinal members or longerons $1a$, $1b$, and a pair of upper longerons $2a$, $2b$. The forward ends of lower longerons $1a$, $1b$ extend all the way to the front or nose plate 4 which is formed as a fireproof board. The forward ends of upper longerons $2a$, $2b$ terminate at some distance behind the nose plate 4 and are joined with the main supporting frame 5. The latter is substantially perpendicular to the longerons and is located at the rear end of cabin space A which extends toward and terminates at the nose plate 4. The upper portion of supporting frame 5 is connected with the upper portion of nose plate 4 by means of a strut 3 which is forwardly and downwardly inclined in a vertical plane substantially centrally of the cabin or cockpit space A. The forward end of strut 3 is bifurcated into a pair of outwardly and downwardly inclined arms $3a$, $3b$. The free ends or terminals of arms $3a$ and $3b$ carry the upper pair of fittings $10a$, $10b$, respectively, to which the power plant 14, diagrammatically shown as a box in FIG. 5, is connected. The lower fittings $9a$, $9b$ for the engine are connected to a crossbar or beam 8 which connects the forward ends of lower longerons $1a$, $1b$. However, the fittings $9a$, $9b$ may be connected directly with the forward ends of longerons $1a$, $1b$, respectively.

The main supporting frame 5 shown in FIGS. 1 and 2 is substantially U-shaped, its upper ends being connected to a substantially horizontal wing spar or beam 11 which is joined with the adjacent rear end of strut 3. Thus, the latter is only indirectly connected with the supporting frame 5, i.e. by means of the wing spar 11.

The just described assembly of four longerons $1a$, $1b$, $2a$ and $2b$, of nose plate 4, of supporting frame 5 and of strut 3 constitutes an extremely sturdy front portion for the fuselage frame, and define a cabin or cockpit A in which the pilot, save for the inclined central strut 3, has a practically unobstructed view in forward and lateral directions. Thus the enclosure A in fact constitutes an all-around visibility cabin space.

The intermediate frame members 6 and 7 installed at spaced intervals between nose plate 4 and supporting frame 5 serve as supporting means for a transparent window or wall 12. Members 6, 7 are preferably arcuate and of inverted U-shape having their uppermost or median points joined with the inclined strut 3, their free ends being connected to lower longerons $1a$, $1b$, respectively. In its preferred form, cabin window 12 consists of two halves at least one of which has an edge swingable about an axis parallel with and adjacent to the strut 3. The latter carries a plurality of hinges 13 to which the edge of each swingable portion or half of window 12 is connected. Only the right-hand half of transparent window 12 is shown in FIGS. 1 and 2 in partly lifted position.

Referring now to FIGS. 3 and 4, there is shown an inclined strut 23 having its rear or upper end bifurcated into a pair of arms $23c$, $23d$ whose terminals are directly connected to a substantially O-shaped or closed main supporting frame 25. Of course, the terminals of upper arms $23c$, $23d$ may also be connected to a wing spar (not shown) in a manner as illustrated in FIGS. 1 and 2. The lower arms $23a$, $23b$ of strut 23 are connected to the upper portion of front or nose plate 4. The lower longerons $1a$, $1b$ and the upper longerons $2a$, $2b$ are again connected to nose plate 4 and to supporting frame 25, respectively. It is preferred to fix the terminals of upper arms $23c$, $23d$ to the supporting frame 25 in line with the front ends of upper longerons $2a$, $2b$, respectively. All other component parts shown in FIGS. 3 and 4 are equivalent to and are therefore numbered as the corresponding elements described in connection with and shown in FIGS. 1 and 2.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

I claim:

1. In a fuselage frame having a vertical plane of symmetry, in combination, a pair of lower longerons each having a forward end; a nose plate connected to said ends of said lower longerons and having an upper portion spaced a predetermined distance from said lower longerons; a supporting frame rearwardly spaced from said nose plate and connected to said lower longerons and having an upper portion spaced from said lower longerons a distance greater than that of said portion of said nose plate; a pair of upper longerons, each having a forward end ending at and being connected to said supporting frame; an inclined strut extending substantially in said plane of symmetry between said upper portion of said nose plate and said upper portion of said supporting frame, said nose plate and said supporting frame together with the portions of said lower longerons extending therebetween and said strut defining a cabin space, leaving the space between said inclined strut and said lower longerons unobstructed; and transparent window means partly enclosing said cabin space and being movably supported by said strut and extending from opposite sides thereof substantially to said lower longerons so that upon movement thereof said unobstructed space between said strut and at least one of said lower longerons might serve as exit and entrance.

2. In a fuselage frame having a vertical plane of symmetry, in combination, a pair of lower longerons each having a forward end; a nose plate connected to said forward ends of said lower longerons and having an upper portion spaced a predetermined distance from said lower longerons; a substantially U-shaped supporting frame rearwardly spaced from said nose plate and connected to said lower longerons and having a pair of upper ends spaced from said lower longerons a distance greater than that of said portion of said nose plate; a pair of upper longerons, each having a forward end ending at and being connected to said pair of upper ends of said supporting frame, respectively; a wing beam extending in the plane of said U-shaped supporting frame and being connected to the upper ends thereof; an inclined strut extending substantially in said plane of symmetry between said upper portion of said nose plate and said wing beam, said nose plate and said supporting frame together with the portions of said lower longerons extending therebetween and said strut defining a cabin space, leaving the space between said inclined strut and said lower longerons unobstructed; and transparent window means partly enclosing said cabin space and being movably supported by said strut and extending from opposite sides thereof substantially to said lower longerons so that upon movement thereof said unobstructed space between said strut and at least one of said lower longerons might serve as exit and entrance.

3. In a fuselage frame having a vertical plane of symmetry, in combination, a pair of lower longerons each having a forward end; a nose plate connected to said forward ends of said lower longerons and having an upper portion spaced a predetermined distance from said lower longerons; a supporting frame rearwardly spaced from said nose plate and connected to said lower longerons and having an upper portion spaced from said lower longerons a distance greater than that of said portion of said nose plate; a pair of upper longerons, each having a forward end ending at and being connected to said supporting frame; an inclined strut extending substantially in said plane of symmetry between said upper portion of said nose plate and said upper portion of said supporting frame, said nose plate and said supporting frame together with the portions of said lower longerons extending therebetween and said strut defining a cabin space; and transparent window means partly enclosing said cabin space and being supported by said strut, said window means comprising a pair of windows respectively located on opposite sides of said strut and each extending from said strut to one of said lower longerons, at least one of said windows being pivotable about said strut; and hinge means connecting said one window with said strut for pivotally supporting said one window on said strut.

4. In a fuselage frame having a vertical plane of symmetry, in combination, a pair of lower longerons each having a forward end; a nose plate connected to said forward ends of said lower longerons and having an upper portion spaced a predetermined distance from said lower longerons; a supporting frame rearwardly spaced from said nose plate and connected to said lower longerons and having an upper portion spaced from said lower longerons a distance greater than that of said portion of said nose plate; a pair of upper longerons, each having a forward end ending at and being connected to said supporting frame; an inclined strut extending substantially in said plane of symmetry between said upper portion of said nose plate and said upper portion of said supporting frame, said nose plate and said supporting frame together with the portions of said lower longerons extending therebetween and said strut defining a cabin space; a pair of intermediate frame members located between said nose plate and said supporting frame and having each a median portion connected to said strut; and transparent window means partly enclosing said cabin space and being supported by said strut, said window means comprising a pair of windows respectively located on opposite sides of said strut and each extending from said strut to one of said lower longerons, at least one of said windows being pivotable about said strut; and hinge means connecting said one window with said strut for pivotally supporting said one window on said strut.

5. In a fuselage frame having a vertical plane of symmetry, in combination, a pair of lower longerons each having a forward end; a nose plate connected to said ends of said lower longerons and having an upper portion spaced a predetermined distance from said lower longerons; a supporting frame rearwardly spaced from said nose plate and connected to said lower longerons and having an upper portion spaced from said lower longerons a distance greater than that of said portion of said nose plate; a pair of upper longerons, each having a forward end ending at and being connected to said supporting frame; an inclined strut extending substantially in said plane of symmetry between said upper portion of said nose plate and said upper portion of said supporting frame, said nose plate and said supporting frame together with the portions of said lower longerons extending therebetween and said strut defining a cabin space, leaving the space between said inclined strut and said lower longerons unobstructed, said strut having a forward and a rear bifurcated end each of which defines a pair of arms and said arms of said rear bifurcated end being connected with said upper portion of said supporting frame and the arms of said forward bifurcated end being connected with said upper portion of said nose plate; and transparent window means partly enclosing said cabin space and being movably supported by said strut and extending from opposite sides thereof substantially to said lower longerons so that upon movement thereof said unobstructed space between said strut and at least one of said lower longerons might serve as exit and entrance.

6. In a fuselage frame having a vertical plane of symmetry, in combination, a pair of lower longerons each having a forward end; a cross beam extending between said forward ends of said lower longerons; a nose plate connected to said ends of said lower longerons and having an upper portion spaced a predetermined distance from said lower longerons; a supporting frame rearwardly spaced from said nose plate and connected to said lower longerons and having an upper portion spaced from said lower longerons a distance greater than that of said portion of said nose plate; a pair of upper longerons, each having a forward end ending at and being connected to said supporting frame; an inclined strut extending substantially in said plane of symmetry between said upper portion of said nose plate and said upper portion of said supporting frame, said nose plate and said supporting frame together with the portions of said lower longerons extending therebetween and said strut defining a cabin space, said strut having a bifurcated forward end defining a pair of arms each having a terminal connected with said upper portion of said nose plate; a power plant located forwardly of said nose plate; a first pair of fittings for said power plant respectively connected to said terminals of said arms; a second pair of fittings for the power plant respectively connected to said forward ends of said lower longerons; and transparent window means partly enclosing said cabin space and being supported by said strut and extending from opposite sides thereof substantially to said lower longerons.

7. In a fuselage frame having a vertical plane of symmetry, in combination, a pair of lower longerons each having a forward end; a cross beam extending between said forward ends of said lower longerons; a nose plate connected to said ends of said lower longerons and having an upper portion spaced a predetermined distance from said lower longerons; a supporting frame rearwardly spaced from said nose plate and connected to said lower longerons and having an upper portion spaced from said lower longerons a distance greater than that of said portion of said nose plate; a pair of upper longerons, each having a forward end ending at and being connected to said supporting frame; an inclined strut extending substantially in said plane of symmetry between said upper portion of said nose plate and said upper portion of said supporting frame, said nose plate and said supporting frame together with the portions of said lower longerons extending therebetween and said strut defining a cabin space, said strut having a bifurcated forward end defining a pair of arms each having a terminal connected with said upper portion of said nose plate; a power plant located forwardly of said nose plate; a first pair of fittings for said power plant, respectively connected to said terminals of said arms; a second pair of fittings for the power plant connected to said cross beam; and transparent window means partly enclosing said cabin space and being supported by said strut and extending from opposite sides thereof substantially to said lower longerons.

References Cited in the file of this patent

UNITED STATES PATENTS

| | | |
|---|---|---|
| 1,810,762 | Gish | June 16, 1931 |
| 1,840,643 | Stout | Jan. 12, 1932 |
| 1,879,632 | O'Brien | Sept. 27, 1932 |
| 2,500,015 | Tweney et al. | Mar. 7, 1950 |

FOREIGN PATENTS

| | | |
|---|---|---|
| 293,363 | Italy | Feb. 19, 1932 |
| 343,617 | Italy | Dec. 9, 1935 |